United States Patent
Zhang et al.

(10) Patent No.: US 8,711,584 B2
(45) Date of Patent: Apr. 29, 2014

(54) REDUCING VOLTAGE STRESS IN A FLYBACK CONVERTER DESIGN

(75) Inventors: Hong Liang Zhang, Singapore (SG); Sen Dou, Shanghai (CN); Ravishanker Krishnamoorthy, Singapore (SG); Biing Long Shu, Singapore (SG); Wanfeng Zhang, Palo Alto, CA (US)

(73) Assignee: Marvell World Trade Ltd., St. Michael (BB)

(*) Notice: Subject to any disclaimer, the term of this patent is extended or adjusted under 35 U.S.C. 154(b) by 80 days.

(21) Appl. No.: 13/336,467

(22) Filed: Dec. 23, 2011

(65) Prior Publication Data

US 2012/0163040 A1    Jun. 28, 2012

Related U.S. Application Data

(60) Provisional application No. 61/427,001, filed on Dec. 23, 2010.

(51) Int. Cl.
H02M 3/335 (2006.01)

(52) U.S. Cl.
USPC .................. 363/21.13; 363/21.18; 363/49

(58) Field of Classification Search
USPC ............ 363/21.01, 21.09, 21.1, 21.12, 21.13, 363/21.18, 49; 323/240, 282, 283, 284, 323/287, 901

See application file for complete search history.

(56) References Cited

U.S. PATENT DOCUMENTS

| | | | |
|---|---|---|---|
| 6,396,718 B1 | 5/2002 | Ng et al. | |
| 6,456,511 B1 | 9/2002 | Wong | |
| 7,362,592 B2 | 4/2008 | Yang et al. | |
| 2006/0171175 A1* | 8/2006 | Zhu et al. | 363/21.12 |
| 2008/0043504 A1 | 2/2008 | Ye et al. | |
| 2008/0192515 A1 | 8/2008 | Huynh et al. | |
| 2009/0009144 A1* | 1/2009 | Hoshikawa et al. | 320/166 |

OTHER PUBLICATIONS

International Search Report and Written Opinion from International Application No. PCT/US2011/067169 filed Dec. 23, 2011.

* cited by examiner

*Primary Examiner* — Gary L Laxton
*Assistant Examiner* — Kyle J Moody

(57) ABSTRACT

Disclosed is flyback converter having a controller that performs a startup switching process when the flyback converter is powered up, and then performs normal switching afterward. The controller includes a pulse generator to generate a control signal for normal switching. During startup switching, the controller may generate a control signal by output every $N_{th}$ pulse from the pulse generator. In another embodiment, the controller may generate pulses based on a sense signal provided from an input section of the flyback converter.

14 Claims, 8 Drawing Sheets

REDUCING VOLTAGE STRESS IN A FLYBACK CONVERTER DESIGN

CROSS REFERENCE TO RELATED APPLICATIONS

The present disclosure claims priority to U.S. Provisional App. No. 61/427,001 filed Dec. 23, 2010, the content of which is incorporated herein by reference in its entirety for all purposes.

FIELD OF THE DISCLOSURE

The present disclosure relates to a switching mode power supply. More particularly, the present disclosure relates to a transformer-based flyback converter.

BACKGROUND

Unless otherwise indicated herein, the approaches described in this section are not prior art to the claims in this application and are not admitted to be prior art by inclusion in this section.

FIG. 1 illustrates a block diagram for a basic flyback converter 100. The flyback converter 100 converts the voltage level of a DC input (e.g., $V_{in}$) to new voltage level $V_{out}$ in order to drive a load. The flyback converter 100 comprises a transformer T having a primary winding and a secondary winding. An input voltage $V_{in}$ is applied to input terminals 102 of the primary winding. The other terminal of the primary winding is connected to a switch Q (e.g., Metal Oxide Semiconductor Field Effect Transistor, MOSFET). A diode D is connected in series between a terminal of the secondary winding and an output terminal 104 of the flyback converter 100 (note the relation of the dotted ends of the primary and secondary windings, where by convention current enters). A capacitor C is connected between output terminal 104 and 106.

When the switch Q is switched ON (closed), an input current $I_P$ from the DC input flows through the primary winding of the transformer T, creating a magnetic field in the transformer core and inducing a voltage in the secondary winding. At this time, the diode D is reverse biased (the dotted end is at a higher potential than the other terminal) and so no current flows through the secondary winding ($I_S$=0).

When switch Q is switched OFF (opened) after some time, the current path in the primary winding is broken ($I_P$=0). The magnetic field collapses causing a voltage reversal to occur in the primary and secondary windings. The reversal in voltage polarity in the secondary winding results in the diode D being forward biased, resulting in the flow of current $I_S$. The current $I_S$ charges capacitor C, causing $V_{out}$ to increase from 0V. When the capacitor C is charged, a current flow $I_C$ from the capacitor can drive a load connected across the output terminals 104 and 106.

A feedback path 108 from the output Vout may be used to control a duty cycle (e.g., the ON time of a switching cycle expressed as a percentage of the period of the switching cycle) of the switching control signal in order to vary the currents $I_P$ and $I_S$ in order to maintain a charge the capacitor C to maintain a desired voltage level for $V_{out}$. At power up, however, $V_{out}$ increases from an initial voltage level of 0V. Accordingly, the feedback path 108 may not be able to provide an adequate feedback signal to properly control the ON and OFF times for switch Q. Depending on the startup sequence used to initially charge the capacitor C, the transformer T may be driven into saturation during the startup sequence. Driving the transformer T into saturation can result in sufficiently high voltage levels across the switch Q (e.g., drain-source voltage $V_{DS}$ in a MOSFET) as to damage the switch. A solution is to use sufficiently large transformer that has a higher saturation rating. However, such devices are generally expensive, and more critically, may be too large for a given design. Likewise, a sufficiently robust MOSFET device having a high voltage rating may be too large for a given design and/or too expensive to use.

SUMMARY

In embodiments, a flyback converter may receive an input voltage on a primary winding of a transformer. During a startup period, a controller circuit controls a transistor switch to control a flow of current through the primary winding. In some embodiments, the controller generates a first control signal having a first duty cycle during the startup period. Subsequent to the startup period, the controller generates a second control signal having a second duty cycle greater than the first duty cycle. The longer OFF time of pulses comprising the first control signal avoid driving the transformer into saturation.

In some embodiments, the controller includes a pulse generator having a given duty cycle. The first control signal may comprise pulses from the pulse generator, and in particular may comprise every $N_{th}$ pulse from the pulse generator.

In an embodiment a count value may be stored in a memory. The value for N may be determined from the count value.

In another embodiment, a sense signal based on the input voltage may be use to generate control pulses for the startup period. In particular, the pulse widths may be determined by monitoring the sense signal. In an embodiment, the monitoring includes comparing the sense signal with a threshold value.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
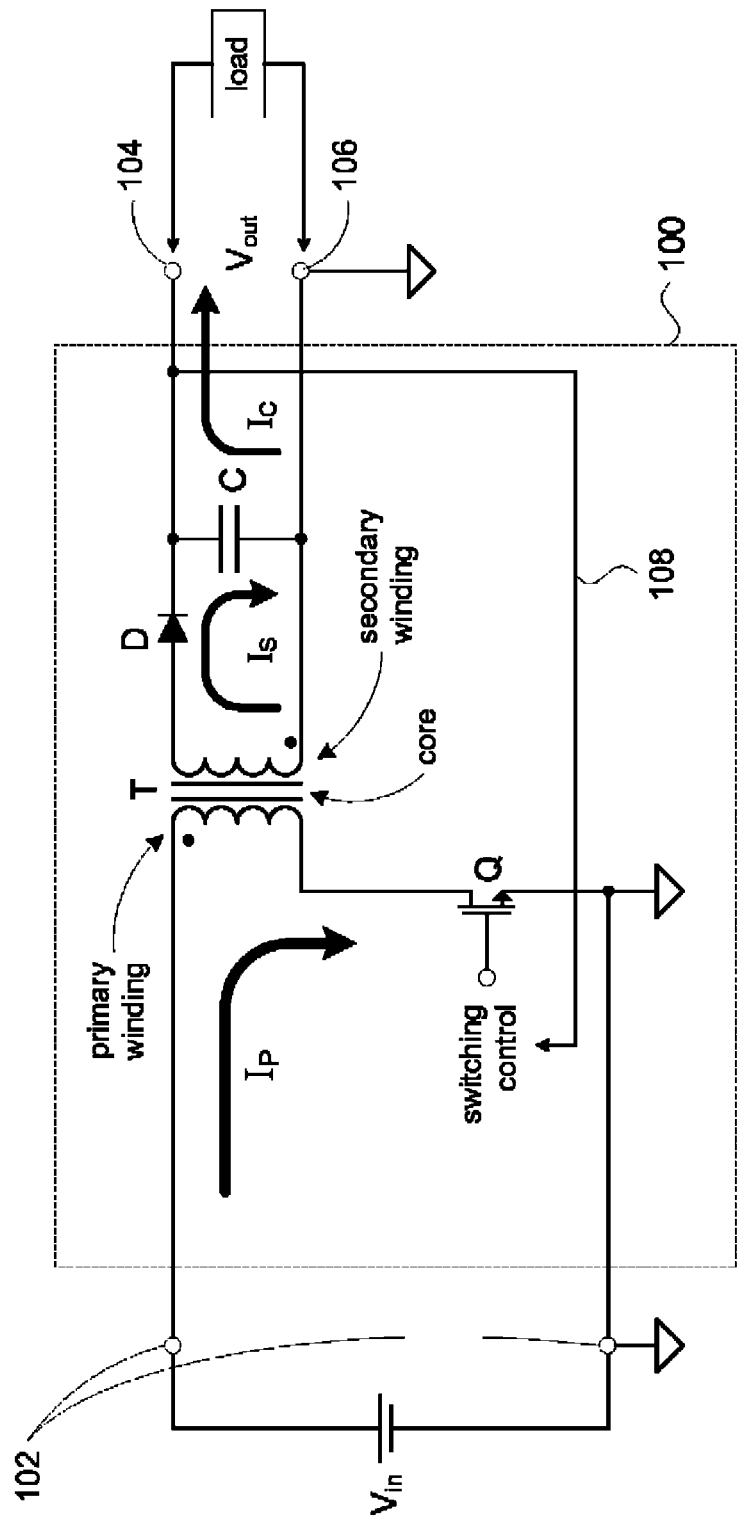
FIG. 1 shows general configuration for a conventional flyback converter.
Figure 2:
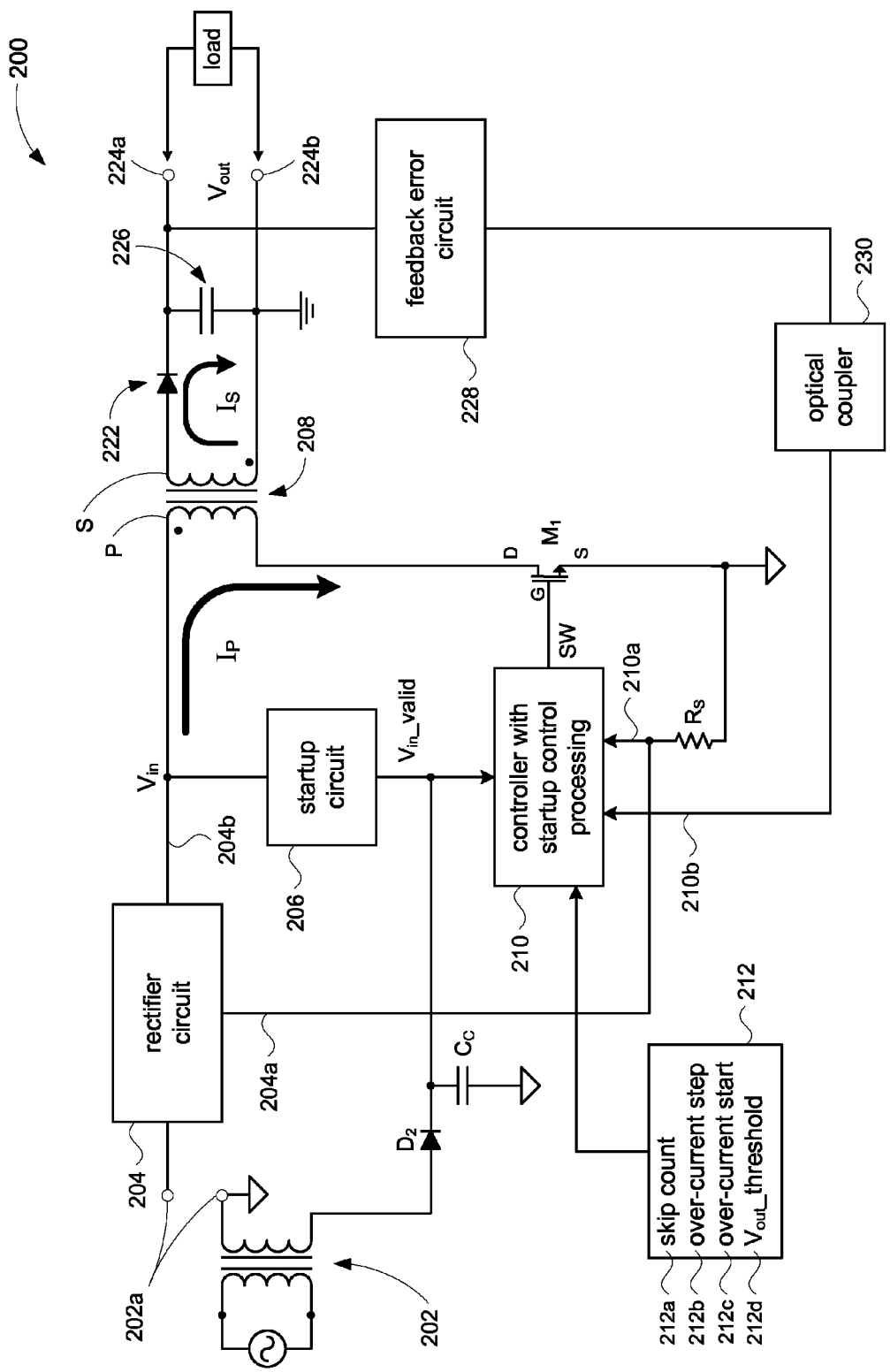
FIG. 2 is a high level block diagram of a flyback converter in accordance with principles of the present disclosure.

In some embodiments, such as illustrated in FIG. 2 for example, a flyback converter 200 may be provided to drive a load (e.g., a Light Emitting Diode, LED, array). In accordance with the present disclosure, the flyback converter 200 may include an input section for receiving an Alternating Current (AC) voltage. In an embodiment, the input section may comprise rectifier circuit 204 and a transformer 202 connected to the rectifier circuit. The rectifier circuit 204 may be a full wave rectifier, a half wave rectifier, and the like. In another embodiment, the input section may comprise only the rectifier circuit 204, where the transformer 202 is considered an external component that is connected to the flyback converter 200 at input terminals 202a.

The rectifier circuit 204 outputs a current 204a to a resistor $R_S$ that is indicative of the input current $I_P$. The rectifier circuit 204 outputs rectified voltage $V_{in}$ 204b to a startup circuit 206 and to a transformer (flyback transformer) 208. In some embodiments, the startup circuit 206 may generate a power supply voltage (e.g., $V_{DD}$) to provide power to a controller 210. The startup circuit 206 may also generate a control signal $V_{in\_valid}$ that the controller 210 may use to determine whether or not to output the switching control signal SW.

In accordance with the present disclosure, the controller 210 is configured to perform a startup switching sequence and a normal switching sequence, which will be explained in more detail below. The controller 210 is connected to a switch M1. In some embodiments, the switch M1 may be a MOSFET power device. The controller 210 generates a switching control signal SW which is may be coupled to a gate terminal G of switch M1, thereby controlling the ON state and OFF state of the switch. The controller 210 receives an over-current sense signal 210a, which in some embodiments, may be a voltage level across the resistor $R_S$. In embodiments, the over-current sense signal 210a is based on the input voltage $V_{in}$ and may be used to detect and over-current condition. As will be explained in more detail below, the over-current signal may be used in some embodiments to control generation of the switching control signal SW.

The controller 210 may be connected to a configuration memory 212 containing parameters to configure operation of the controller. For example, in accordance with principles of the present disclosure, the configuration memory 212 may include one or more parameters, including skip count 212a, over-current step value 212b, over-current start value 212c, and $V_{out\_}$threshold 212d, which will be described in more detail below.

In some embodiments, the controller 210 may be implemented as an Application Specific Integrated Circuit (ASIC), or with a Digital Signal Processor (DSP), or using a Field Programmable Gate Array (FPGA), and so on. The configuration memory 212 may be incorporated into the logic of the controller 210, or the configuration memory may be a memory device (e.g., flash memory) separate from the controller logic.

The transformer 208 includes a primary winding P and a secondary winding S. The rectified voltage 204b from the rectifier circuit 204 is connected to the "dotted" terminal of the primary winding. The "dot" nomenclature is a conventional notation used when designing with transformers to indicate the direction of current flow. The undotted terminal of the primary winding P is connected to a drain terminal D of the switch $M_1$. The source terminal S of the switch $M_1$ is connected to ground potential.

On the secondary side, a diode 222 is connected between the undotted terminal of the secondary winding S and an output terminal 224a of the flyback converter 200. The dotted terminal of the secondary winding S is connected to another output terminal 224b of the flyback converter 200. A capacitor 226 is connected between the terminals of the secondary winding S.

A feedback error circuit 228 and an optical coupler 230 provide a feedback path to the controller 210. The feedback error circuit 228 outputs a level based on the output voltage $V_{out}$ of the flyback converter 200. The optical coupler 230 provides a feedback signal 210b to an input of the controller 210, while at the same time isolating the output side (i.e., circuitry connected to the secondary winding S) of the flyback converter 200 from the controller to protect the controller (and other circuitry on the input side; for example, the circuitry connected to the primary winding P) from potential damage due to high voltages that may be generated on the output side.

As will be explained in more detail below, the controller 210 uses the feedback signal 210b to control the switching of switch $M_1$ during the normal switching sequence. In some embodiments, the configuration memory 212 may include a threshold voltage level $V_{out}$-threshold 212d that the controller 210 uses to maintain a desired level of $V_{out}$.

General operation of the flyback converter 200 includes the controller 210 controlling the switch $M_1$ to turn ON for a period of time, thus producing a flow of current $I_P$ in the primary winding P that increases over time. The increase in $I_P$ during the ON period can be expressed as follows:

$$\Delta I_P = \frac{V_{in} \times T_{on}}{L_m}, \quad (\text{Eqn. 1})$$

where
$\Delta I_P$ is the change in the current $I_P$ during the ON period,
$V_{in}$ is the input voltage,
$T_{on}$ is the amount of time of the ON period of the switch $M_1$, and
$L_m$ is the inductance of the primary winding P of the transformer 208.

During the ON time of switch $M_1$, there is no flow of current through the secondary winding S of the transformer 208; i.e. $I_S=0$.

When the controller 210 controls the switch $M_1$ to turn OFF, current flow $I_P$ ceases and a current flow $I_S$ is produced as the magnetic field in the transformer 208 begins to collapse. The change in the current $I_S$ during the OFF period can be expressed as:

$$\Delta I_S = \frac{(V_{out} + Vf_d) \times T_{off}}{L_m / N_t^2}, \quad (\text{Eqn. 2})$$

where
$\Delta I_S$ is the change in the current $I_S$, during the OFF period
$V_{out}$ is the output voltage of the flyback converter 200,
$Vf_d$ is the forward voltage drop of the diode 222,
$T_{off}$ is the amount of time of the OFF period of the switch $M_1$,
$L_m$ is the inductance of the primary winding P of the transformer 208, and
$N_t$ is the transformer winding turns ratio of the transformer 208.

During the OFF time of switch $M_1$, there is no flow of current through the primary winding P of the transformer 208; i.e. $I_P=0$.

To complete the discussion of the general operation of the flyback converter 200, the build up of the output voltage $V_{out}$, from a power off state where $V_{out}=0V$, occurs incrementally with each cycle of ON and OFF periods of the switch $M_1$. The amount of current that accumulates on the capacitor 226 in each cycle is given by:

$$\Delta I_{avg} = \frac{V_{in} \times T_{on}}{L_m} - \frac{1}{2}\Delta I_S, \quad \text{(Eqn. 3)}$$

where
- $\Delta I_{avg}$ is the average change in current in the secondary winding S for each OFF period,
- $V_{in}$ is the input voltage,
- $T_{on}$ is the amount of time of the ON period of the switch $M_1$,
- $L_m$ is the inductance of the primary winding P of the transformer 208, and
- $\Delta I_S$ is the change in the current $I_S$, during the OFF period.

The change in the output voltage $V_{out}$ in each cycle is given by:

$$\Delta V_{out} = \Delta I_{avg} \times \frac{T_{off}}{C_o}, \quad \text{(Eqn. 4)}$$

where
- $\Delta V_{out}$ is the output voltage,
- $\Delta I_{avg}$ is the average change in current in the secondary winding S for each OFF period,
- $T_{off}$ is the amount of time of the OFF period of the switch $M_1$, and
- $C_o$ is capacitance of capacitor 226.

Figure 3:
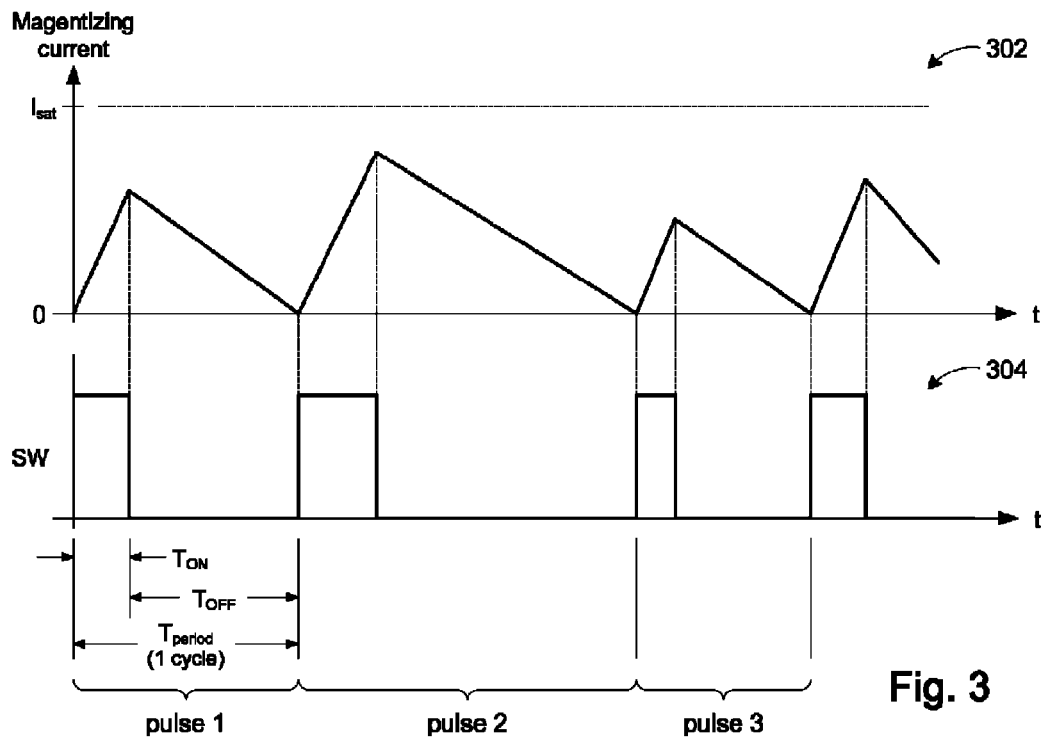
FIGS. 3 and 4 represent waveforms of the magnetizing current in a transformer.

Referring to FIG. 3, the graphs depicted in the figure show a trace 304 of pulses that may comprise the switching control signal SW produced by the controller 210, and a trace 302 of the magnetizing current in the transformer 208. The magnetizing current relates to current flowing the in the primary winding P during an ON period of the switch $M_1$. The magnetizing current creates the magnetic field in the transformer 208 during the ON period. During the subsequent OFF period, the magnetic field collapses and current in the secondary winding S is induced. As current in the secondary winding S continues to increase, the magnetizing current in the transformer decreases. The trace 302 shows that the peaks in the magnetizing current do not exceed a parameter of the transformer 208 called the saturation current $I_{sat}$. This parameter is sometimes referred to as maximum flux density ($B_{max}$), which can be computed from $I_{sat}$.

FIG. 3 depicts a "normal switching" period of operation of the flyback converter 200. Under ideal conditions, the switching control signal SW can maintain the output voltage $V_{out}$ at a constant level using pulses that have a constant pulse width and a constant duty cycle. However, the level of $V_{out}$ will generally vary and so the feedback circuit 228 serves to maintain a constant charge on the capacitor 226 in order to maintain a constant $V_{out}$. Accordingly, the controller 210 may adjust the pulses that constitute the switching control signal SW by varying their period $T_{period}$, their ON time $T_{ON}$, their OFF time $T_{OFF}$, and so on, based on the feedback signal 210b. During the normal switching period, the output voltage $V_{out}$ is sufficiently large that a detectable voltage level can be fed back to the controller 210 to produce suitable pulses (SW) to control the switch $M_1$. The waveforms depicted in FIG. 3 have been greatly exaggerated in order to illustrate the foregoing observations.

As can be seen from Eqn. 1, the current $I_P$ in the primary winding varies inversely as the transformer inductance $L_m$. However, when the transformer is driven into saturation (e.g., $I_P > I_{sat}$), the inductance of the core of the transformer 208 suddenly drops, and the current in the primary winding P suddenly increases. The sudden change in current creates a very high voltage across the drain and source of the switch $M_1$, which may damage the switch if it is not rated for a sufficiently high operating voltage. Under normal switching, the controller 210 can ensure that magnetizing current in the transformer does not exceed the saturation current $I_{sat}$ by properly controlling the pulses (SW) based on the feedback signal 210b.

Figure 4:
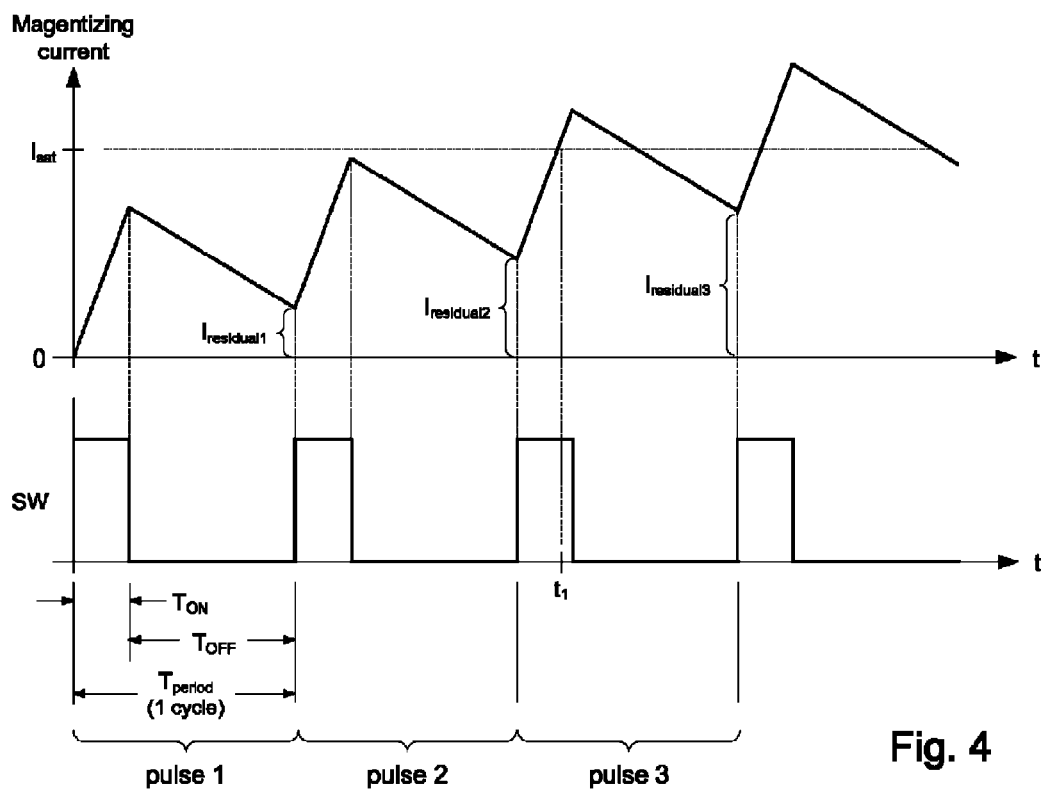

FIG. 4 illustrates a scenario where the transformer 208 is driven into saturation. A magnetizing current in the transformer 208 is set up during the ON period of pulse 1 and reaches a peak level at then end of the ON period when it begins to discharge during the OFF period. However, the magnetizing current does not fully discharge by the end of the OFF period of pulse 1, leaving a residual magnetizing current $I_{residual1}$. When the switch $M_1$ is turned ON by pulse 2, the magnetizing current in transformer 208 will begin to increase starting from the level of $I_{residual1}$, this time reaching a higher peak level at the end of the ON period of pulse 2 than before. Again, the magnetizing current does not fully discharge by the end of the OFF period of pulse 2, leaving yet a higher residual magnetizing current $I_{residual2}$. As can be seen in FIG. 4, the transformer 208 is driven into saturation by pulse 3 at time $t_1$. The residual magnetizing current may be expressed by the following:

$$I_{residual} = \Delta I_P - \frac{\Delta I_S}{N_t}, \quad \text{(Eqn. 5)}$$

where
- $I_{residual}$ is the residual magnetizing current,
- $\Delta I_P$ is the current in the primary winding P generated during an ON period (see Eqn. 1),
- $\Delta I_S$ is the current in the secondary winding S generated during the subsequent OFF period (see Eqn. 2), and
- $N_t$ is the transformer windings turn ratio of the transformer 208.

When the flyback converter 200 is powered up from a power off state, the output voltage $V_{out}$ is initially 0V and will incrementally increase from 0V. It can be appreciated from Eqns. 2 and 5 that the residual magnetizing current in the transformer 208 will be higher during the startup period than during the normal switching period of operation. The startup period therefore presents an increased chance of driving the transformer into saturation and thus an increased risk in damaging the switch $M_1$. Therefore, in accordance with principles of the present disclosure, embodiments of the controller 210 provide control processing during the startup period.

Figure 5:
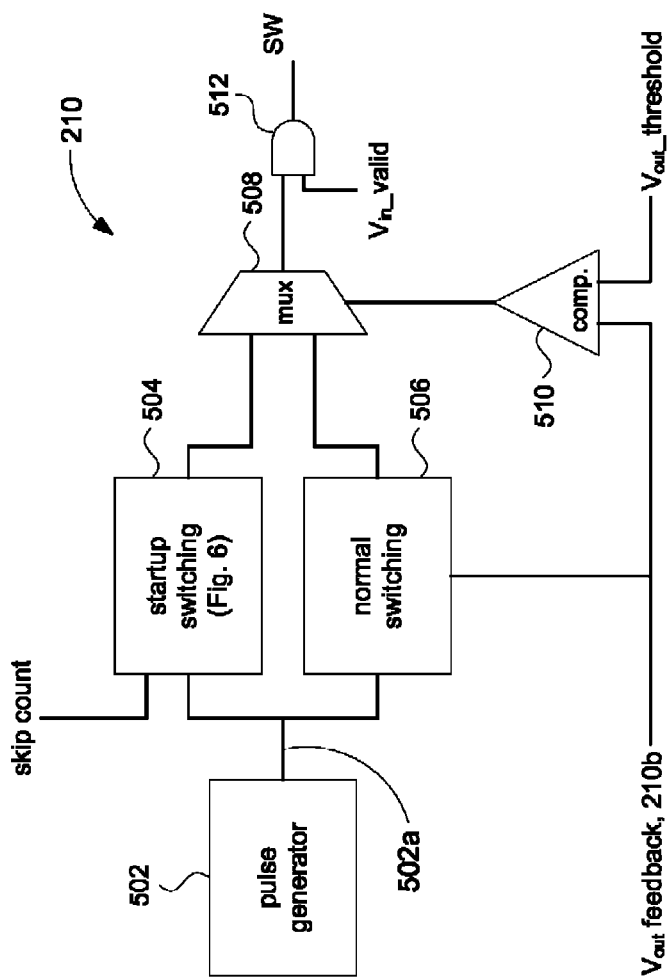
FIG. 5 is a block diagram of an embodiment of the controller shown in FIG. 2.

Referring to FIG. 5, in some embodiments the controller 210 may include a pulse generator 502, a startup switching block 504, and a normal switching block 506. The pulse generator 502 produces a pulse train 502a (Pulse_gen) that feeds into the startup switching block 504 and the normal switching block 506. In an embodiment, the pulse train comprises pulses have substantially the same period and substantially the same duty cycle. The pulses may be used to generate the switching control signal SW. A mux 508 selects between an output of the startup switching block 504 and an output of the normal switching block 506 as the switching control signal SW. Mux selection is controlled by a comparator 510 which compares the $V_{out}$ feedback signal 210b with the $V_{out\_}$ threshold parameter 212d received from the configuration memory 212.

The switching control signal SW is obtained from the normal switching block 506 when the flyback converter 200 has completed its startup sequence. In some embodiments, for example, the comparator 510 may provides an indication that the startup sequence has completed by comparing the $V_{out}$ feedback signal 210b with the $V_{out\_}$ threshold parameter 212d. During the normal switching period, the normal switching block 506 may simply pass the output pulses generated by the pulse generator 502 onto the mux 508 to be output as switching control signal SW. In addition, the normal switching block 506 may modify or otherwise change the pulses received from the pulse generator 502 in accordance with the $V_{out}$ feedback signal 210b in order to maintain a proper voltage level for $V_{out}$.

In accordance with the present disclosure, the switching control signal SW is obtained from the startup switching block 504 during a startup period of operation of the flyback converter 200; e.g., as determined by the comparator 510. The startup switching block 504 receives the skip count parameter 212a from the configuration memory 212 which, in some embodiments, is used to generate the switching control signal SW.

In some embodiments, the output of mux 508 may be gated by an AND gate 512 that is controlled by the $V_{in\_}$valid signal from the startup circuit 206. In embodiments, the $V_{in\_}$valid signal is used to disable the output of the switching control signal SW for brown out protection. Thus, for example, when the startup circuit 206 detects a brown out condition, the $V_{in\_}$valid signal may go LO, but remains HI otherwise.

Figure 6:
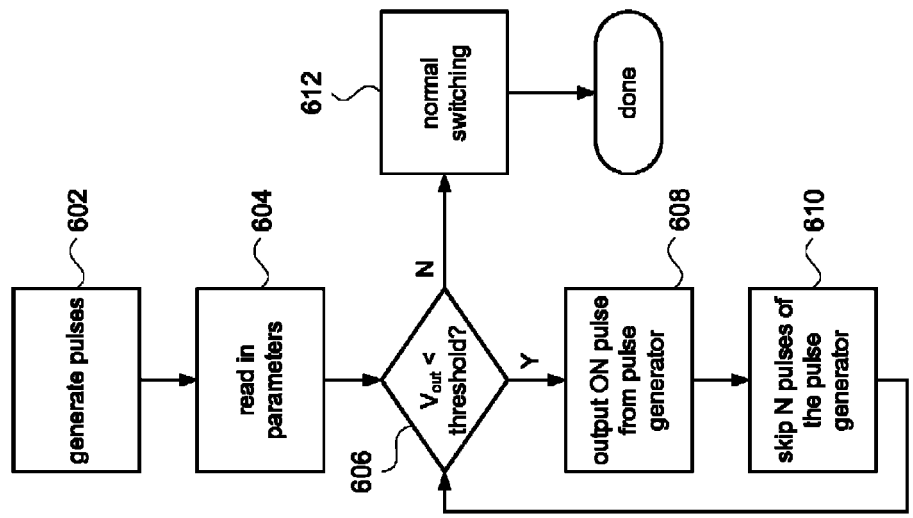
FIG. 6 illustrates processing in an embodiment of the controller shown in FIG. 5.

Referring to FIG. 6, processing of the controller 210 shown in FIG. 5 is illustrated. At 602, the pulse generator 502 begins generating pulses. Parameters are read in from the configuration memory 212 at 604. For example, the skip count parameter 212a is read in and used in the startup switching block 504 and the $V_{out\_}$threshold parameter 212d is read in and used by the comparator 510.

At 606, a determination is made whether the startup sequence has completed. In embodiments, the startup sequence is deemed to have completed when the $V_{out}$ feedback signal 210b is greater than a threshold value determined by the $V_{out\_}$threshold parameter 212d. Accordingly, the comparator 510 performs a comparison of the $V_{out}$ feedback signal 210b and the $V_{out\_}$threshold parameter 212d. The comparator 510 selects the output of the startup switching block 504 (via mux 508) when the $V_{out}$ feedback signal 210b is less than the $V_{out\_}$threshold parameter 212d. When the $V_{out}$ feedback signal $210b \geq V_{out\_}$threshold parameter 212d, then the comparator 510 selects the output of the normal switching block 506 to perform normal switching (at 612).

If the $V_{out}$ feedback signal 210b is less than the $V_{out\_}$threshold parameter 212d, processing proceeds to 608, where the startup switching block 504 receives a first pulse of the output 502a from the pulse generator 502 and outputs that first pulse to the mux 508. At 610, the startup switching block 504 receives the next N pulses (where N is set equal to the skip count parameter 212a) from the pulse generator and skips them by not outputting the N pulses to the mux 508. Processing then returns to 606.

Figure 7:
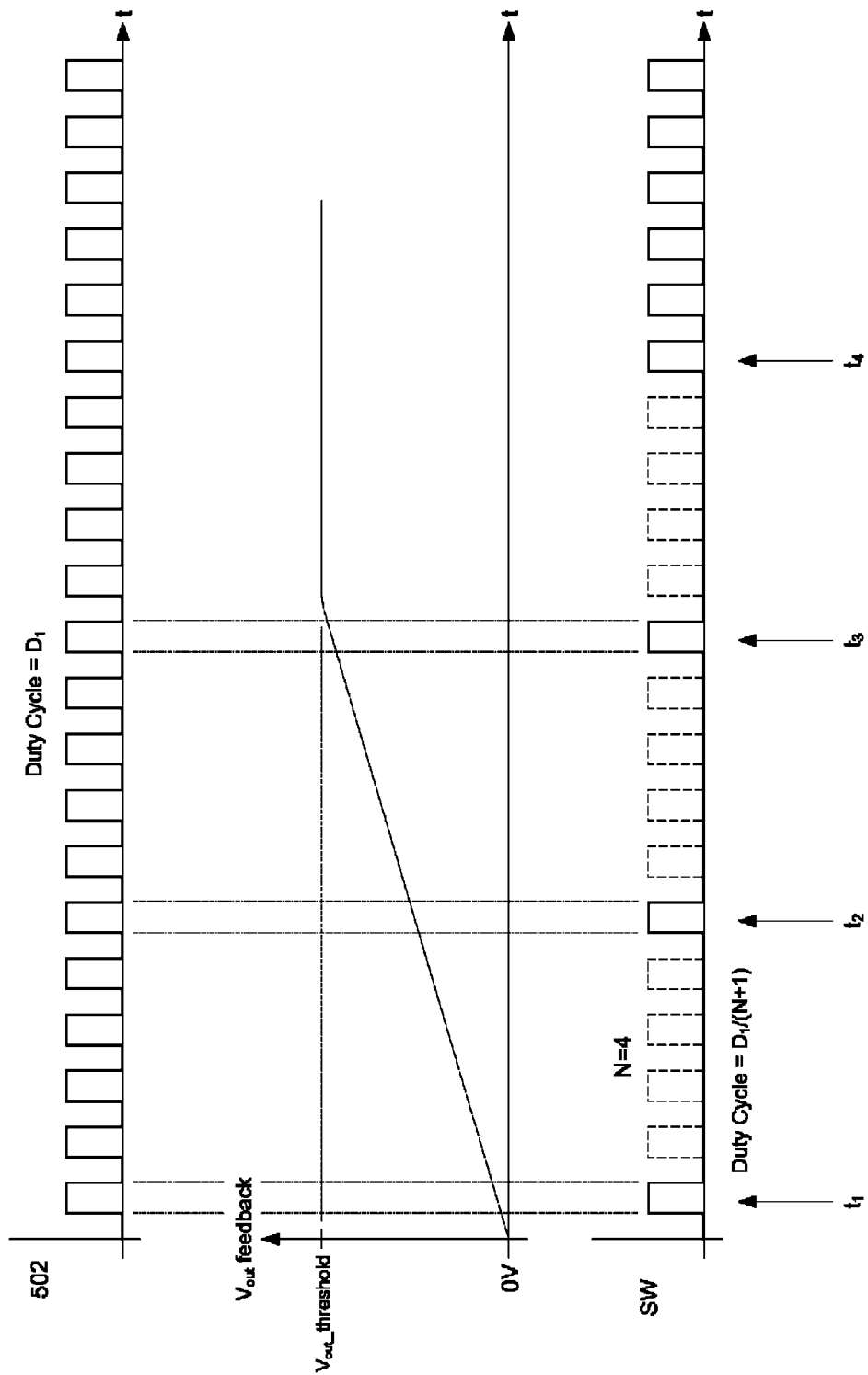
FIG. 7 shows the waveforms relating to processing by the controller shown in FIG. 5.
Figure 9:
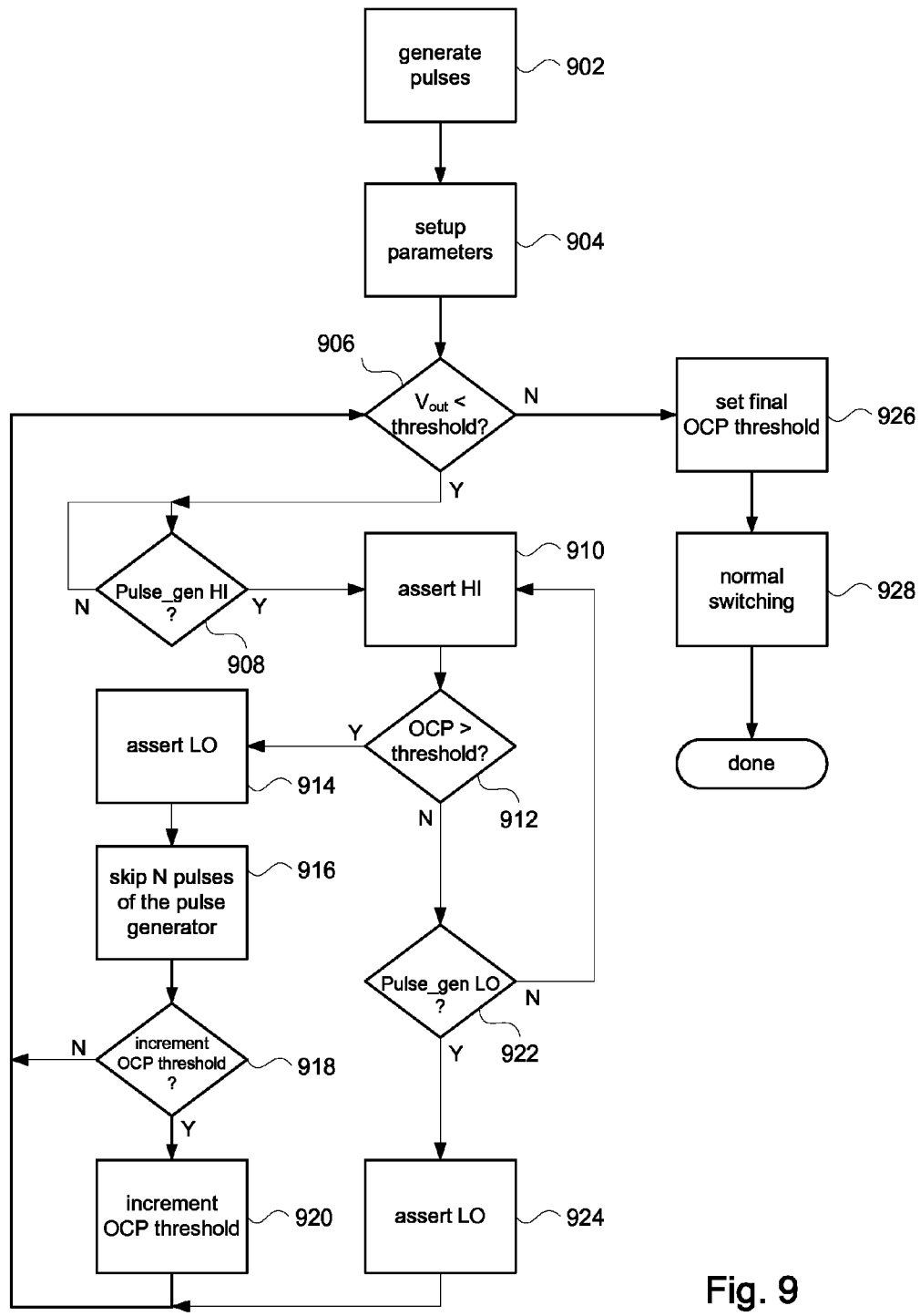
FIG. 9 illustrates processing in an embodiment of the controller shown in FIG. 8.

Referring to FIG. 7, timing traces illustrate the timing between the pulses generated by the pulse generator 502 and the generated switching control signal SW in relation to the $V_{out}$ feedback signal 210b. The top trace shows a train of pulses generated by the pulse generator 502. In accordance with the flow chart of FIG. 6, startup switching at 606-610 produce the switching control signal SW shown in the bottom trace. At time $t_1$, a first pulse from the pulse generator 502 appears as a pulse in the switching control signal SW. Then for the next N pulses (which in FIG. 9 is N=4), where N is equal to the skip count parameter 212a, are skipped and do not appear in the switching control signal SW. This is repeated at times $t_2$ and $t_3$ as the $V_{out}$ feedback voltage signal 210b steadily increases. When the $V_{out}$ feedback voltage signal 210b reaches $V_{out\_}$threshold at time $t_4$, then normal switching takes place where the pulses from the pulse generator 502 are output to the switching control signal SW.

It can be appreciated that in accordance with the present disclosure, the duty cycle of the switching control signal SW changes between the startup switching sequence and the normal switching sequence. Since the startup switching sequence always skips N pulses, for each pulse that is output to the switching control signal SW, the duty cycle of the switching control signal is reduced by a factor of 1/(N+1) during startup switching as compared to normal switching.

Figure 8:
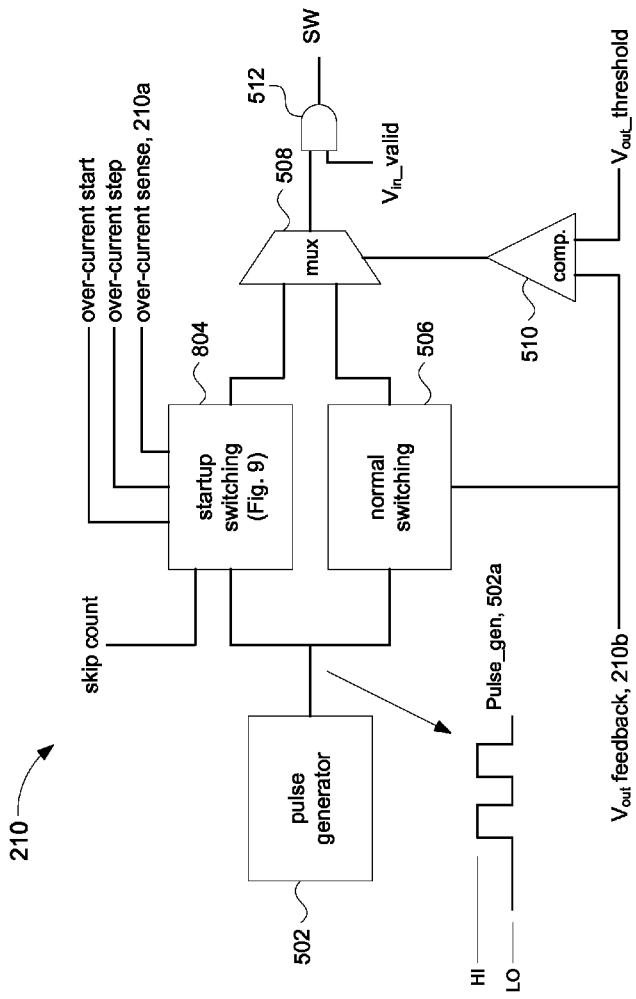
FIG. 8 is a block diagram of another embodiment of the controller shown in FIG. 2.

Referring to FIG. 8, another embodiment of the controller 210 is shown. The controller 210 comprises the same elements as illustrated in FIG. 5. However, in the embodiment shown in FIG. 8, a startup switching block 804 is configured to receive over-current parameters 212b and 212c from the configuration block. In addition, the startup switching block 804 employs the over-current sense signal 210a in a feedback loop to control the pulse widths of the switching control signal SW during the startup switching sequence.

Referring to FIG. 9, processing of the controller 210 shown in FIG. 8 is illustrated. At 902, the pulse generator 502 begins generating pulses. Parameters are read in from the configuration memory 212 and setup, at 904. For example, the skip count parameter 212a is read in and used in the startup switching block 804 and the $V_{out\_}$threshold parameter 212d is read in and used by the comparator 510. In addition, an over-current step parameter 212b and an over-current start parameter 212c are read in. The over-current start parameter 212c is used to set an initial value for an over-current threshold value.

At 906, a determination is made whether the startup sequence has completed. In embodiments, the startup sequence is deemed to have completed when the $V_{out}$ feedback signal 210b is greater then a threshold value determined by the $V_{out\_}$threshold parameter 212d. Accordingly, the comparator 510 performs a comparison of the $V_{out}$ feedback signal 210b and the $V_{out\_}$threshold parameter 212d. The comparator 510 selects the output of the startup switching block 504 (via mux 508) when the $V_{out}$ feedback signal 210b is less than the $V_{out\_}$threshold parameter 212d. When the $V_{out}$ feedback signal $210b \geq V_{out\_}$threshold parameter 212d, then the comparator 510 selects the output of the normal switching block 506.

If the $V_{out}$ feedback signal 210b is less than the $V_{out\_}$threshold parameter 212d, then at 908 the startup switching block 504 waits for a HI to occur in the output 502a of the pulse generator 502, at which time the startup switching block asserts a logic HI on its output (at 910). The output of the startup switching block 504 is output to the switching control signal SW via mux 508. At 912, the over-current threshold value is compared with the over-current sense signal 210a. If the over-current sense signal 210a is less than the over-current threshold value, then at 922 the process continues according the whether the output 502a of the pulse generator 502 is HI or LO. If LO, then the startup switching block 504 asserts LO at 924 and processing continues at 906; otherwise, the startup switching block asserts HI at 910 and processing repeats at 912 by comparing the over-current threshold value with the over-current sense signal 210a. When the over-current sense signal 210a exceeds the over-current threshold value, then at 914 the output of the startup switching block 504 asserts a logic LO, thus defining an ON pulse in the switching control signal SW.

At 916, the startup switching block 504 receives N pulses (where N is set equal to the skip count parameter 212a) from the pulse generator and skips them by not outputting the N pulses to the mux 508. If, at 918, the over-current threshold value is to be increment, then at 920 the over-current threshold value is incremented by the over-current step parameter 212b received from the configuration memory 212. Processing then repeats from 906. On the next pass through the loop 906-920, since the over-current threshold has been increased, the ON pulse in the switching control signal SW will be wider by operation of the loop 908-912.

At 906, when the $V_{out}$ feedback signal 210b becomes greater than the $V_{out\_}$ threshold parameter 212d, then processing proceeds to 926 where the over-current threshold value is set to a final reference value. Then in at 928, normal switching is performed.

Figure 10:
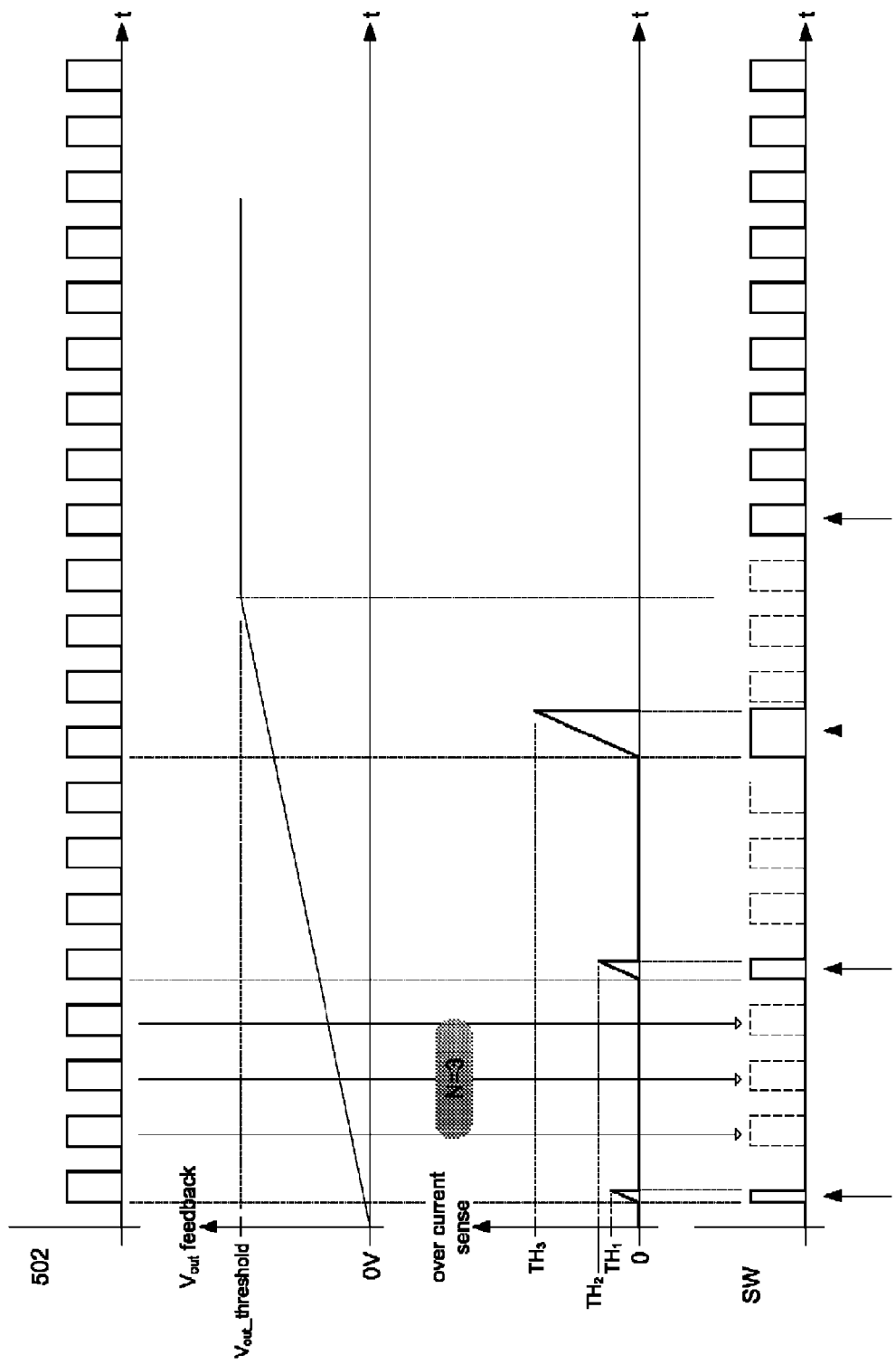
FIG. 10 shows the waveforms relating to processing by the controller shown in FIG. 8.

Referring to FIG. 10, timing traces illustrate the timing between the pulses generated by the pulse generator 502, the over-current sense signal, and the generated switching control signal SW in relation to the $V_{out}$ feedback signal 210b. The top trace shows a train of pulses generated by the pulse generator 502. In accordance with the flow chart of FIG. 9, startup switching in at 908-912 produces the first pulse in switching control signal SW at time t1, shown in the bottom trace. The over-current threshold is set to $TH_1$. When the over-current sense signal 210a reaches $TH_1$, the first pulse is formed. In the example shown, the skip count parameter 212a is set to 3. Accordingly, the next N=3 pulses are skipped and do not appear in the switching control signal SW. This is repeated at times $t_2$ and $t_3$, with the over-current threshold value being incrementally increased to $TH_2$ and then to $TH_3$. At time $t_4$, the $V_{out}$ feedback voltage signal 210b reaches $V_{out\_}$ threshold at time. Normal switching takes place where the pulses from the pulse generator 502 are output to the switching control signal SW.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of they may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the claims.

What is claimed is:
1. A method for adjusting a duty cycle of switching of a switch in a flyback converter, wherein the flyback converter further includes a transformer having (i) a primary winding and (ii) a secondary winding, wherein the switch is coupled to the primary winding of the transformer, the method comprising, while applying an input voltage to the primary winding of the transformer;
  alternately switching the switch between a closed position and an opened position in accordance with a first duty cycle, wherein while the switch is in the open position, no current flows in the secondary winding of the transformer, and wherein while the switch is in the closed position, current flows in the secondary winding of the transformer which causes an output voltage of the flyback converter to increase;
  applying the output voltage to a load based on the current flowing through the secondary winding;
  while the switch is being alternately switched between the closed position and the opened position in accordance with the first duty cycle, monitoring the output voltage of the flyback converter to determine whether the output voltage has exceeded a voltage threshold, wherein the voltage threshold is predetermined and set to limit the output voltage supplied to the load;
  in response to the output voltage being determined to have exceeded the voltage threshold, alternately switching the switch between the open position and the closed position in accordance with a second duty cycle, wherein the second duty cycle is greater than the first duty cycle;
  generating a first control signal having the first duty cycle;
  generating a second control signal having the second duty cycle, wherein the second control signal is separate from the first control signal, wherein alternately switching the switch between the closed position and the opened position in accordance with the first duty cycle comprises alternately switching the switch based on the first control signal, and wherein alternately switching the switch between the closed position and the opened position in accordance with the second duty cycle comprises alternately switching the switch based on the second control signal;
  controlling a level of current flowing through the secondary winding according to the first control signal during a first period of time;
  controlling the level of current flowing through the secondary winding according to the second control signal during a second period of time, wherein the second period of time is subsequent to the first period of time;
  generating a first plurality of pulses during the first period of time, wherein the first plurality of pulses are output at a predetermined frequency;
  generating a second plurality of pulses during the second period of time, wherein the second plurality of pulses are output at the predetermined frequency;
  during the first period of time, outputting every predetermined number of pulses from of the first plurality of pulses as the first control signal during the first period of time;
  during the second period of time, outputting every pulse from each of the second plurality of pulses as the second control signal at the time subsequent to the first period of time;
  comparing a first threshold value to the level of the current flowing through the switch;
  based on a result of the comparing of the first threshold value to the level of the current flowing through the switch, generating a first pulse to be output as the first control signal;
  incrementing the first threshold value to provide a second threshold value;

comparing the second threshold value to the level of the current flowing through the switch; and based on the comparing of the second threshold value to the level of the current flowing through the switch, generating a second pulse to be output as the first control signal.

2. The method of claim 1, wherein:

while the switch is in the closed position, a magnetizing current is created in a core of the transformer; and alternately switching the switch between the closed position and the opened position in accordance with the first duty cycle or the second duty cycle to prevent the magnetizing current in the core of the transformer from exceeding a saturation level of the transformer.

3. The method of claim 1, wherein the switch is alternately switched between the closed position and the opened position in accordance with the first duty cycle during a startup period in which the flyback converter is powered up from a power off state.

4. The method of claim 1, further comprising:

reading a memory for a predetermined value; and determining the predetermined number of pulses based on the predetermined value.

5. The method of claim 1, further comprising:

comparing the voltage supplied to the load to the voltage threshold; and controlling the switch with the second control signal when the voltage supplied to the load exceeds the voltage threshold.

6. A circuit comprising:

a transformer having a first winding and a second winding, wherein the second winding supplies a voltage to a load, wherein the first winding is a primary winding of the transformer;

a transistor connected to the first winding, wherein the transistor is configured to enable and disable a current flow through the first winding;

a comparator configured to compare the voltage supplied to the load to a voltage threshold; and a controller connected to the transistor, wherein the controller is configured to a) set the voltage threshold to limit the voltage supplied to the load, b) generate a first control signal having a first duty cycle, c) generate a second control signal having a second duty cycle, wherein the second duty cycle is greater than the first duty cycle, d) based on a first output of the comparator and during a first period of time, (i) select the first control signal rather than the second control signal, and (ii) control the transistor with the first control signal, e) based on a second output of the comparator, select the second control signal rather than the first control signal, f) at the time subsequent to the first period of time, control the transistor with the second control signal, g) compare a first threshold value to a level of current flowing through the transistor, h) based on a result of the comparing of the first threshold value to the level of the current flowing through the transistor, generate a first pulse to be output as the first control signal, i) increment the first threshold value to provide a second threshold value, j) compare the second threshold value to the level of the current flowing through the transistor, and k) based on the comparing of the second threshold value to the level of the current flowing through the transistor, generate a second pulse to be output as the first control signal.

7. The circuit of claim 6, wherein:

the first winding is configured to generate a magnetically induced current in a core of the transformer; and the controller is configured to control the transistor such that the magnetically induced current does not exceed a threshold level during the first period of time, wherein the threshold level is a saturation current level of the transformer.

8. The circuit of claim 6, further comprising a pulse generator configured to (i) generate a first plurality of pulses during the first period of time, and (ii) a second plurality of pulses during a second period of time, wherein:

the second period of time is subsequent to the first period of time;

the first control signal comprises every Nth pulse of the first plurality of pulses generated by the pulse generator during the first period of time, where N is an integer greater than or equal to two; and the second control signal comprises each of the second plurality of pulses generated by the pulse generator during the second period of time.

9. The circuit of claim 8, further comprising a memory configured to store a predetermined value, wherein the controller is configured to determine the integer N based on the predetermined value.

10. The circuit of claim 6, wherein the controller is configured to:

monitor a level of current flowing through the transistor;

generate a plurality of pulses to be output as the first control signal; and based on the level of the current flowing through the transistor, controlling pulse widths of the plurality of pulses.

11. A flyback converter comprising:

the circuit of claim 6; and a feedback loop connected between the load and the controller, wherein the feedback loop provides the voltage supplied to the load to the controller.

12. A method for adjusting a duty cycle of switching of a switch in a flyback converter, wherein the flyback converter further includes a transformer having (i) a primary winding and (ii) a secondary winding, wherein the switch is coupled to the primary winding of the transformer, the method comprising, while applying an input voltage to the primary winding of the transformer:

alternately switching the switch between a closed position and an opened position in accordance with a first duty cycle, wherein while the switch is in the open position, no current flows in the secondary winding of the transformer, and wherein while the switch is in the closed position, current flows in the secondary winding of the transformer which causes an output voltage of the flyback converter to increase;

applying the output voltage to a load based on the current flowing through the secondary winding;

while the switch is being alternately switched between the closed position and the opened position in accordance with the first duty cycle, monitoring the output voltage of the flyback converter to determine whether the output voltage has exceeded a voltage threshold, wherein the voltage threshold is predetermined and set to limit the output voltage supplied to the load;

in response to the output voltage being determined to have exceeded the voltage threshold, alternately switching the switch between the open position and the closed position in accordance with a second duty cycle, wherein the second duty cycle is greater than the first duty cycle;

generating a plurality of pulses;

determining whether the voltage supplied to the load is less than a first threshold;

if the output voltage supplied to the load is less than the first threshold, (i) transitioning an output of a first switching device to a first state while generating a first series of pulses, and (ii) supplying the first series of pulses to the switch, wherein the first series of pulses are generated based on the plurality of pulses and during a first period of time;

if the voltage supplied to the load is greater than or equal to the first threshold, (i) setting a current threshold, and (ii) during a second period of time, generating a second series of pulses based on the current threshold and the plurality of pulses, wherein the second period of time is subsequent to the first period of time;

determining whether a level of the current flowing through the switch is greater than a second threshold;

if the level of the current flowing through the switch is greater than the second threshold, (i) transitioning the output of the first switching device to a second state, (ii) skipping a predetermined number of the plurality of pulses, and (iii) incrementing the second threshold; and if the level of the current flowing through the switch is less than or equal to the second threshold, transitioning the output of the first switching device to the second state.

13. A circuit comprising:
a transformer having a first winding and a second winding, wherein the second winding supplies a voltage to a load;
a transistor connected to the first winding, wherein the transistor is configured to enable and disable a current flow through the first winding;
a comparator configured to compare the voltage supplied to the load to a voltage threshold; and
a controller connected to the transistor, wherein the controller is configured to
  a) set the voltage threshold to limit the voltage supplied to the load,
  b) generate a first control signal having a first duty cycle,
  c) generate a second control signal having a second duty cycle, wherein the second duty cycle is greater than the first duty cycle,
  d) based on a first output of the comparator and during a first period of time, (i) select the first control signal rather than the second control signal, and (ii) control the transistor with the first control signal,
  e) based on a second output of the comparator, select the second control signal rather than the first control signal, and
  f) at the time subsequent to the first period of time, control the transistor with the second control signal,
wherein
  the controller comprises a multiplexer and a logic gate,
  the multiplexer is configured to (i) based on the first output of the comparator, select the first control signal, and (ii) based on the second output of the comparator, select the second control signal,
  the logic gate receives an output of the multiplexer and a brown out signal,
  the brown out signal indicates whether a brown out condition exists, and
  an output of the logic gate controls the transistor.

14. A circuit comprising:
a transformer having a first winding and a second winding, wherein the second winding supplies a voltage to a load;
a transistor connected to the first winding, wherein the transistor is configured to enable and disable a current flow through the first winding;
a comparator configured to compare the voltage supplied to the load to a voltage threshold;
a controller connected to the transistor, wherein the controller is configured to
  a) set the voltage threshold to limit the voltage supplied to the load,
  b) generate a first control signal having a first duty cycle,
  c) generate a second control signal having a second duty cycle, wherein the second duty cycle is greater than the first duty cycle,
  d) based on a first output of the comparator and during a first period of time, (i) select the first control signal rather than the second control signal, and (ii) control the transistor with the first control signal,
  e) based on a second output of the comparator, select the second control signal rather than the first control signal, and
  f) at the time subsequent to the first period of time, control the transistor with the second control signal;
a first switching device configured to (i) receive a pulse signal, a skip value, the voltage threshold, and a current value, and (ii) output a first series of pulses based on the pulse signal, the skip value, the voltage threshold, and the current value,
wherein
  the skip value indicates a number of pulses in the pulse signal to skip,
  the threshold value is a current threshold of the transistor, and
  the current value is a level of current flowing through the transistor;
a second switching device configured to (i) receive the pulse signal and the voltage supplied to the load, and (ii) output a second series of pulses based on the pulse signal and the voltage supplied to the load; and
a multiplexer configured to (i) based on the first output of the comparator, select the output of the first switching device, or (ii) based on the second output of the comparator, select the output of the second switching device,
wherein the transistor is controlled based on the output of the multiplexer.

* * * * *